United States Patent [19]
Lefebvre

[11] Patent Number: 5,944,979
[45] Date of Patent: Aug. 31, 1999

[54] ELECTROKINETIC TRANSFER OF CONTAMINANTS FROM A THIN LAYER OF SOIL TO A THIN POROUS MEDIUM

[75] Inventor: Guy Lefebvre, Sherbrooke, Canada

[73] Assignee: Universite de Sherbrooke, Sherbrooke, Canada

[21] Appl. No.: 08/904,259

[22] Filed: Jul. 31, 1997

Related U.S. Application Data

[63] Continuation-in-part of application No. 08/819,832, Mar. 18, 1997, abandoned.

[30] Foreign Application Priority Data

Mar. 18, 1996 [CA] Canada ................................. 2172016

[51] Int. Cl.⁶ .............................. C02F 1/469; B01D 61/42
[52] U.S. Cl. ......................... 205/766; 204/515; 204/516; 204/600; 204/648
[58] Field of Search ........................ 205/766; 204/515, 204/516, 600, 648

[56] References Cited

U.S. PATENT DOCUMENTS

| | | | |
|---|---|---|---|
| Re. 35,074 | 10/1995 | Lamarre | 210/747 |
| 3,980,547 | 9/1976 | Kunkle | 204/301 |
| 4,323,445 | 4/1982 | Alekhin et al. | 204/300 R |
| 4,678,554 | 7/1987 | Oppitz | 204/299 R |
| 4,758,318 | 7/1988 | Yoshida | 204/131 |
| 5,074,986 | 12/1991 | Probstein et al. | 204/130 |
| 5,092,972 | 3/1992 | Ghowsi | 204/182.1 |
| 5,098,538 | 3/1992 | Kim et al. | 204/182.2 |
| 5,101,899 | 4/1992 | Hoskins et al. | 166/248 |
| 5,137,608 | 8/1992 | Acar et al. | 204/130 |
| 5,171,409 | 12/1992 | Barnier et al. | 204/182.2 |
| 5,190,628 | 3/1993 | Bibler | 204/182.4 |
| 5,226,545 | 7/1993 | Foust | 209/3 |
| 5,230,809 | 7/1993 | Roslonski | 210/748 |
| 5,240,570 | 8/1993 | Chang et al. | 204/130 |
| 5,262,024 | 11/1993 | Lomasney et al. | 204/157.43 |
| 5,308,507 | 5/1994 | Robson | 210/748 |
| 5,316,411 | 5/1994 | Buelt et al. | 405/128 |
| 5,342,449 | 8/1994 | Holbein et al. | 134/2 |
| 5,391,018 | 2/1995 | Parker | 405/128 |
| 5,398,756 | 3/1995 | Brodsky et al. | 166/248 |
| 5,403,455 | 4/1995 | Candor | 204/180.1 |
| 5,405,509 | 4/1995 | Lomasney et al. | 204/130 |
| 5,407,543 | 4/1995 | Miller | 204/130 |
| 5,415,744 | 5/1995 | Jacobs | 204/130 |
| 5,425,881 | 6/1995 | Szejtli et al. | 210/747 |
| 5,433,829 | 7/1995 | Pool | 204/130 |
| 5,435,895 | 7/1995 | Lindgren et al. | 204/182.2 |
| 5,449,249 | 9/1995 | Husten | 405/128 |
| 5,458,747 | 10/1995 | Marks et al. | 204/130 |
| 5,469,048 | 11/1995 | Donohue | 324/71.1 |

FOREIGN PATENT DOCUMENTS

| | | |
|---|---|---|
| 0 312 174 | 4/1989 | European Pat. Off. . |
| 865225 | 9/1981 | U.S.S.R. . |
| 994418 | 2/1983 | U.S.S.R. . |

*Primary Examiner*—Arun S. Phasge
*Attorney, Agent, or Firm*—Griffin, Butler, Whisenhunt & Szipl, LLP

[57] ABSTRACT

To decontaminate soil, a generally thin porous medium is used. A cathode is applied to one face of the porous medium and an anode is spaced apart from the other face of that porous medium to define a generally thin spacing for receiving a generally thin layer of soil to be decontaminated. An electric potential is applied to the first and second electrodes in view of transferring the contaminants from the thin layer of soil to the porous medium. A porous membrane may be positioned between the thin layer of soil and the anode. The system may be of the conveyor type to enable displacement of the porous medium, the porous membrane, and the layer of soil between the anode and the cathode. Also, the system may comprises a series of at least two pairs of anode and cathode supplied with electric potentials of different amplitudes.

19 Claims, 2 Drawing Sheets

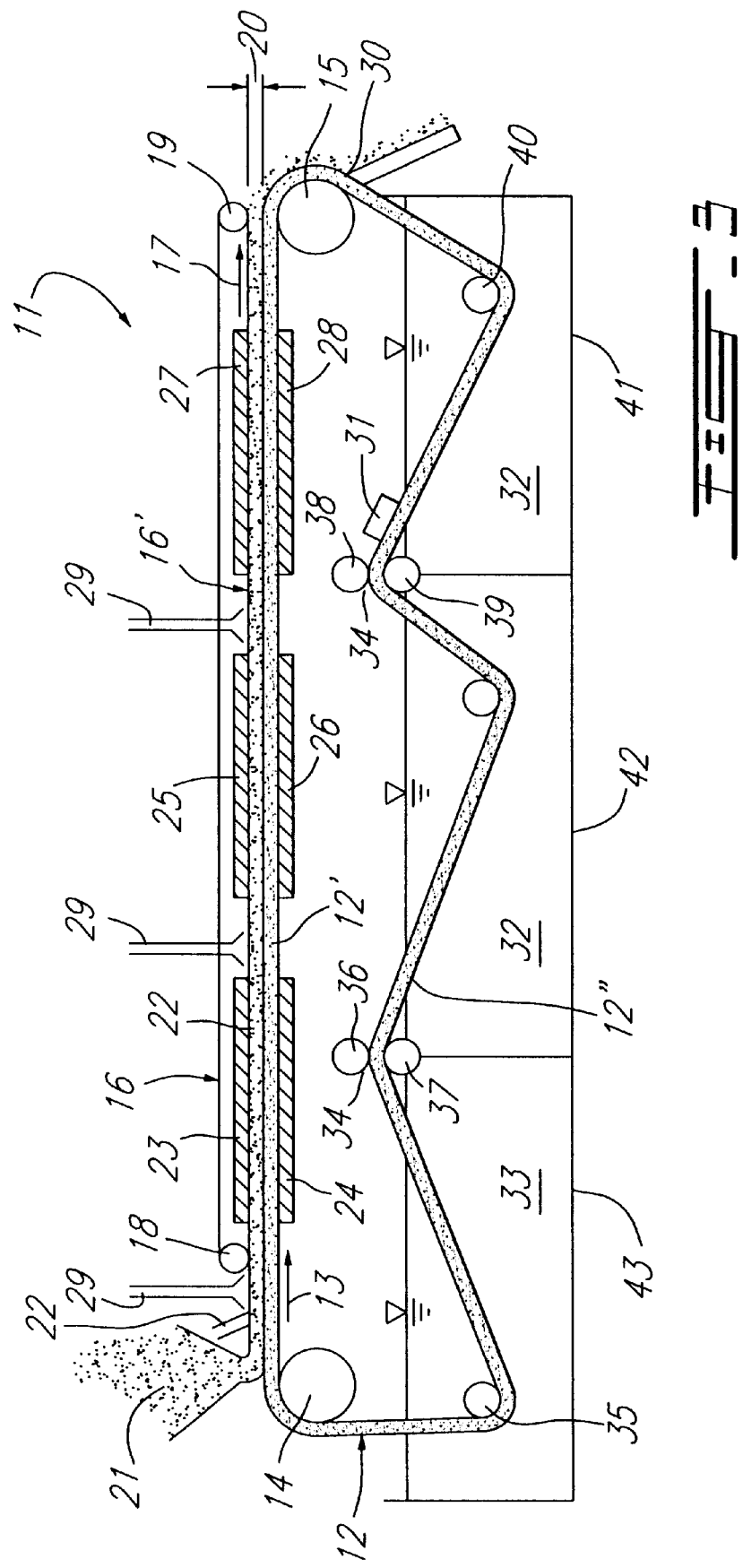

ELECTROKINETIC TRANSFER OF CONTAMINANTS FROM A THIN LAYER OF SOIL TO A THIN POROUS MEDIUM

This application is a continuation-in-part application of application Ser. No. 08/819,832, filed on Mar. 18, 1997, now abandoned.

BACKGROUND OF THE INVENTION

1. Field of the Invention

The present invention relates to electrokinetic decontamination of soil, and more particularly to the rapid transfer of contaminants from the soil to a porous medium, from which the contaminants are easily retrieved afterwards.

2. Brief Description of the Prior Art

An electric potential, when applied to a soil through anode(s) and cathode(s), induces a migration of ions in addition to an electro-osmotic flow. Such an electro-osmotic flow displaces any contaminant existing in the pore fluid of a soil. If the contaminants are present in the pore fluid as ions, these ions will also move due to the electric potential without the need of any electro-osmotic flow.

When an electric potential is applied to a soil containing water, through electrodes, the molecules of water are dissociated by electrolysis into $H^+$ ions and $OH^-$ ions. In response to the electric potential, the $H^+$ ions produced at the anode will move into the soil, thus reducing the pH of the soil and enhancing the solubilization of some contaminants, like heavy metals for example. On the other hand, the $OH^-$ ions will also move into the soil thus increasing the pH of this soil in the vicinity of the cathode and thus enhancing the precipitation of some contaminants, like heavy metals for example. Obviously, this precipitation of certain contaminants into the soil in the vicinity of the cathode restricts the extraction of these contaminants out of the soil. For that reason, most prior art patents addressing the electrokinetic decontamination of soil teach the control of the pH at the cathode by circulation of some acidic solutions in order to avoid the pH reduction and the accumulation of certain contaminants into the soil in the vicinity of the cathode.

In most situations, electro-osmotic flow moves from the anode(s) to the cathode(s). In the case of contaminants existing as cations in the fluid, like heavy metals for example, the ionic migration caused by the electric potential will progress from the anode(s) to the cathode(s). In most situations, soil decontamination will progress from the anode(s) to the cathode(s).

For a given volume of soil to be treated by an electrokinetic process, the time and the electric energy required for the decontamination are proportional to the distance between the anode(s) and the cathode(s).

However, the progress of the decontamination of the soil between the anode(s) and the cathode(s) is not proportional to the treatment time and to the applied electric energy. The solubilization by acidification and the decontamination first progress rapidly in the vicinity of the anode. This initial decontamination in the anodic zone is, for a large part, a transfer of the contaminant to the vicinity of the cathode. Once the anodic zone of the soil is decontaminated, a relatively long time and a relatively large quantity of electric energy are required to acidify and decontaminate the cathodic zone of the soil.

Most of the prior art patents in the field of electrokinetic decontamination of soil recover the contaminant at the electrodes and thus count on the migration of the contaminants from one electrode to the other, or count on the decontamination of all the solid medium existing between the anode(s) and the cathode(s). The electrodes are either inserted in the ground (see for example U.S. Pat. Nos. 4,758,318 (Yoshida); 5,098,538 (Kim et al.); 5,190,628 (Bibler); etc.)) for in-situ treatment or placed at the ends of large cells for ex-situ treatment (see for example U.S. Pat. No. 5,137,608 (Acar et al.)).

More recently, U.S. Pat. No. 5,405,509 (Lomasney et al.) has proposed decontamination of soil using an electropotential gradient inducing migration of a target ion and immobilization and/or confinement of this target ion by an ion-permeable host receptor matrix. In this patent like in all cases of prior art, the feasibility of the treatment calls for a certain distance of soil between the anode(s) and the cathode (s). Decontamination of such a thick layer of soil is time-consuming and requires a large quantity of energy. In the prior art, the contaminants are extracted at the electrodes and must travel or migrate through the soil over a fairly large distance. This reduces the efficiency of the decontamination method.

OBJECTS OF THE INVENTION

An object of the present invention is to reduce to a minimum the distance of migration of the contaminants in the soil. More specifically, it is an object of the present invention to reduce the distance of migration of the contaminants due to either electro-osmotic flow or ion movement to a few centimeters or less if desired.

Another object of the invention is to replace the soil in the cathodic zone where the contaminants tend to accumulate by a porous medium where the contaminants will accumulate and will be easily retrieved afterwards.

Still another object of the subject invention is to provide a decontamination method and system in which the control of the pH at the electrodes is not critical since the raise of the pH in the cathodic zone enhances the accumulation of certain contaminants only in the porous medium.

A still further object of the present invention is to provide a decontamination method and system in which the contaminated soil is fed continuously or in steps to a conveyor and passes through different pairs of anode(s) and cathode(s) operating at the same or different levels of voltage or current intensity.

It is also an object of the present invention to provide a porous membrane between the anode(s) and the layer of soil which can be resaturated with water or conditioning solutions between each pair of electrodes.

Finally, an object of the invention is to provide a decontamination method and system in which the porous medium replacing the zone of the soil in which the contaminants tend to accumulate is automatically cleaned and reconditioned during the decontamination process.

SUMMARY OF THE INVENTION

More particularly, in accordance with the present invention, there is provided a method for decontaminating soil, comprising the steps of:

applying an electric potential to a pair of first and second electrodes, wherein the first and second electrodes have respective, mutually facing first and second surfaces;

placing between the first and second surfaces of the first and second electrodes a generally thin layer of soil superposed to a generally thin porous medium, to expose the layer of soil to the electric potential in view of transferring contaminants from the thin layer of soil to the porous medium, wherein the placing step comprises positioning the thin porous medium proximate to the first surface of the first electrode and filling the space between the porous medium and the second surface of the second electrode with the thin layer of soil.

In the most common situation, the contaminants will move from the anode to the cathode, the thin layer of soil constituting the anodic zone and the porous medium constituting the cathodic zone. In response to the electric potential, the acidification due to electrolysis and the decontamination progress rapidly in the anodic zone, the anodic zone being the soil to decontaminate. At this early stage, the contaminants of the anodic zone have been transferred to the cathodic zone (porous medium). Trapping of the contaminants in the cathodic zone is also enhanced by the raise of the pH due to electrolysis.

The method of the present invention drastically reduces the time and the electric energy as compared to previous art because the distance between the anode(s) and the cathode(s) is reduced to a minimum and because the contaminants do not have to be extracted at the electrodes, but have simply to be moved from the anodic zone to the cathodic zone. Since a certain increase in pH is allowed in the cathodic zone, no circulating solution is required at the cathode to control the pH like in the previous art.

In accordance with preferred embodiments of the method according to the invention:

the layer of soil has a thickness lower than 6 cm, and the thickness of the porous medium varies between 2 mm and 20 mm;

the step of positioning the thin porous medium proximate to the first surface of the first electrode comprises applying the porous medium to the first surface of the first electrode;

the method further comprises the step of interposing a porous membrane between the thin layer of soil and the second surface of the second electrode; and the method also comprises the step of displacing the porous medium, the porous membrane, and the layer of soil between the first surface of the first electrode and the second surface of the second electrode.

The present invention also relates to a system for decontaminating soil, comprising:

a generally thin porous medium having first and second opposite faces;

first and second electrodes respectively situated on opposite sides of the porous medium, the first and second electrodes having respective, mutually facing first and second surfaces, the first surface of the first electrode lying proximate the first face of the porous medium, and the second surface of the second electrode being spaced apart from the second face of the porous medium to define between the second face of the porous medium and the second surface of the second electrode a generally thin spacing for receiving a generally thin layer of soil to be decontaminated; and means for applying an electric potential to the first and second electrodes in view of transferring the contaminants from the thin layer of soil to the porous medium.

Preferably, the first surface of the first electrode is applied to the first face of the porous medium.

The system may comprise a porous membrane between the thin layer of soil and the second surface of the second electrode, and means for displacing the porous medium, the porous membrane, and the layer of soil between the first surface of the first electrode and the second surface of the second electrode.

Further in accordance with the present invention, there is provided a system for decontaminating soil, comprising:

a first, lower conveyor belt forming a porous medium and having an upper run defining upper and lower opposite faces;

first and second electrodes respectively situated on opposite sides of the upper run of the first conveyor belt, the first and second electrodes having respective, mutually facing first and second surfaces, the first surface of the first electrode being applied to the lower face of the upper run of the first conveyor belt, and the second surface of the second electrode being spaced apart from the upper face of the upper run of the first conveyor belt;

a second, upper conveyor belt forming a porous membrane and having a lower run defining an upper face applied to the second surface of the second electrode and a lower face delimiting with the upper face of the first conveyor belt a generally thin spacing;

means for supplying a thin layer of soil to a first end of the upper run of the first conveyor belt;

means for driving the first and second conveyor belts to move the upper and lower runs in the same direction and thereby move the thin layer of soil through the thin spacing between the lower face of the lower run and the upper face of the upper run; and means for applying an electric potential to the first and second electrodes in view of transferring contaminants from the thin layer of soil to the porous medium as the thin layer of soil displaces between the first and second electrodes.

According to a first preferred embodiment, there is provided a series of at least two pairs of electrodes, wherein (a) the electrodes of each pair have respective, mutually facing surfaces, (b) one of the mutually facing surfaces of the electrodes of each pair is applied to the lower face of the upper run of the first conveyor belt, and (c) the other of the mutually facing surfaces of the electrodes of each pair is applied to the upper face of the lower run of the second conveyor belt, whereby driving of the first and second conveyor belts displaces the thin layer of soil successively between the electrodes of the successive pairs of the series. Electric potentials of different amplitudes may be applied to the respective pairs of electrodes of the series. Therefore, the system according to the invention enables application of the treatment in stages by moving the soil and the porous medium on a conveyor in between different pairs of anode and cathode.

According to a second preferred embodiment of the invention, there is provided means for recovering the decontaminated soil at a second end of the upper run of the first conveyor belt, and means for cleaning and reconditioning the porous medium in a second, lower run of the first conveyor belt. Preferably, these cleaning and reconditioning means comprises at least one of the following means: (a) means for scrubbing the first conveyor belt, (b) means for flushing the first conveyor belt, (c) means for immersing the first conveyor belt in at least one solution, and (d) means for wringing the first conveyor belt. When the contaminants are mainly heavy metals, the cleaning solutions will be acidic to solubilize the heavy metals accumulated in the porous medium and to recondition the pH of the porous medium for its re-introduction in the system.

The reservoir or circulation at the anode generally found in the previous art may be replaced in this invention by the sprinkling or addition of water or conditioning solutions to the porous membrane before entering each pair of electrodes.

The objects, advantages and other features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 3 is a side elevational view of a conveyor system in accordance with the present invention for conducting an on-line, continuous electrokinetic treatment of a thin layer of contaminated soil.

DETAILED DESCRIPTION OF THE PREFERRED EMBODIMENTS

Figure 1:
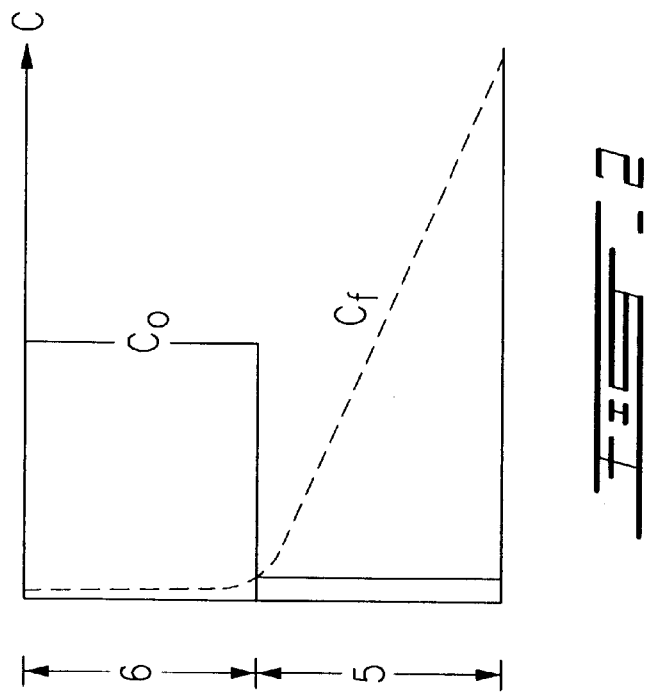
FIG. 1 is an elevational, schematic view of a system comprising two electrodes and a porous medium for decontaminating a layer of soil.

The system of FIG. 1 comprises two electrodes 1 and 2 having opposite polarities and comprising respective, mutually facing planar surfaces 3 and 4. A first face 7 of a generally thin porous medium 5 is applied to the surface 4 of the electrode 2, and a generally thin layer of soil 6 to be decontaminated is placed between a second surface 8 of the porous medium 5 and the surface 3 of the electrode 1. A presaturated porous membrane 9 is interposed between the layer of soil 6 and the surface 3 of the electrode 1.

A number of materials can be used to form the porous medium. The selected material needs to be porous and will not react with the contaminants to make them difficult to extract from the porous medium afterwards. The material of the porous medium is preferably a continuous and flexible material but could also be a particular or granular material separated from the soil by a porous membrane.

A voltage source 10 applies an electric potential (voltage V) to the electrodes 1 and 2. In the system of FIG. 1, the electrode 1 is the anode and the electrode 2 is the cathode. Therefore, the thin layer of soil 6 constitutes an anodic zone and the porous medium 5 a cathodic zone.

Due to electro-osmosis, the pore fluid in the soil moves from the anode 1 to the cathode 2. The positive ions also move from the anode 1 to the cathode 2.

In response to the electric potential (voltage V), the $H^+$ ions produced by electrolysis of the soil water at the contact soil-anode will move away from the anode 1 and penetrate into the soil (anodic zone), lowering the soil pH and enhancing the solubilization of certain contaminants like heavy metals. In addition of the electro-osmotic flow, the applied electric potential V will force the migration of all cations in the solution, including heavy metals from the anode 1 to the cathode 2, whereby these cations will be transferred to the porous medium (cathodic zone) 5.

Due to the above described electro-osmotic flow and ionic movement, the contaminants are transferred from the layer of soil (anodic zone) 6 to the porous medium (cathodic zone) 5.

Figure 2:
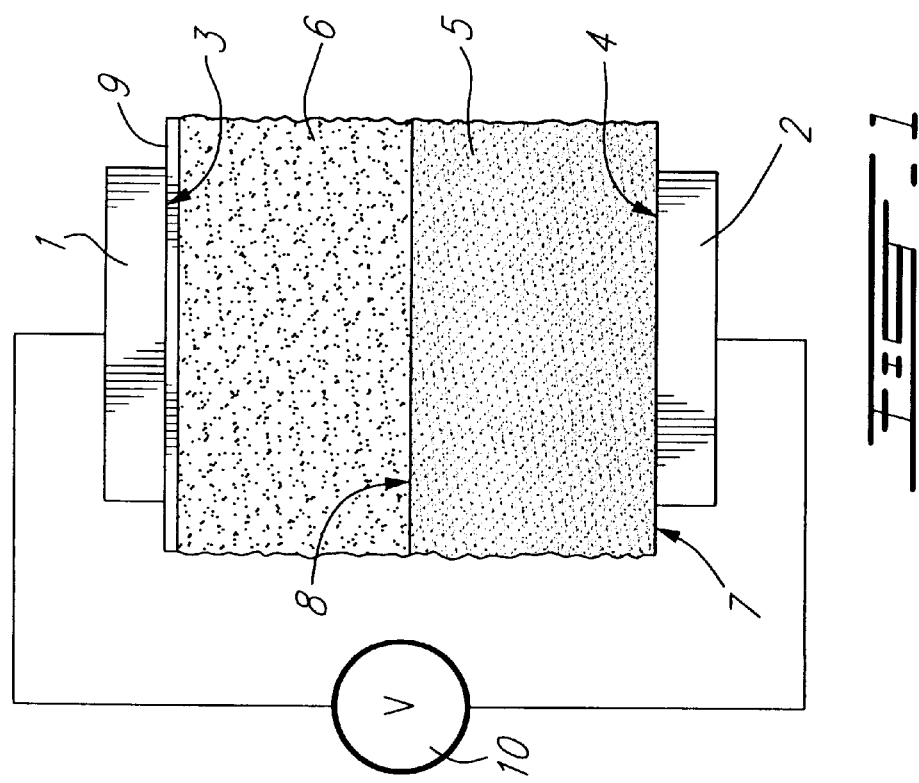
FIG. 2 is a graph showing the level of contaminants in the soil and in the porous medium of FIG. 1 before and after the electrokinetic treatment.

FIG. 2 is a graph showing schematically the concentration or level C of contaminants in the layer of soil 6 and in the porous medium 5.

More specifically, the solid line $C_0$ of the graph of FIG. 2 represents the concentration of contaminants before the electrokinetic treatment. Before treatment, the contaminants are concentrated in the layer of soil 6. At this stage, the level of contaminants in the porous medium 5 reflects only the residual contamination remaining in this medium 5 after previous cleaning and/or reconditioning thereof.

The dashed line $C_f$ of the graph of FIG. 2 represents the level or concentration of contaminants both in the layer of soil 6 and in the porous medium 5 at the end of the electrokinetic treatment. At this stage, the concentration of contaminants in the layer of soil 6 has been reduced to the desired level and is concentrated in the thin porous medium 5.

As indicated in the foregoing description, FIG. 3 is a side elevational view of a conveyor system 11 in accordance with the present invention for conducting an on-line, continuous electrokinetic treatment of a thin layer of contaminated soil.

The conveyor system 11 of FIG. 3 comprises a lower conveyor belt 12 having an upper run 12' driven longitudinally in direction 13 between a pair of transversal rollers 14 and 15. The conveyor belt 12 also comprises a lower run 12". In the embodiment of FIG. 3, the conveyor belt 12 forms the porous medium. To that effect, the conveyor belt is completely made of a material suitable to form the porous medium. Alternatively, the conveyor belt 12 incorporates a material forming the porous medium or comprises an outer layer made of the porous medium material.

The conveyor system 11 of FIG. 3 also comprises an upper conveyor belt 16 made of a porous membrane and having a lower run 16' moving in direction 17 between a pair of transversal rollers 18 and 19. The lower run 16' of the upper belt 16 has an underside spaced apart from the top face of the upper run 12' of the belt 12 by a constant distance. A generally thin, constant spacing 20 is therefore delimited between the lower run 16' of the upper belt 16 and the upper run 12' of the conveyor belt 12.

As illustrated in FIG. 3, the upper conveyor belt 16 is shorter than the conveyor belt 12 to enable a feeding device 21 to deposit a thin layer of contaminated soil 22 onto the top face of the upstream end of the upper run 12' of the conveyor belt (porous medium) 12. The feeding device 21 is associated to a thickness regulator device 22 to adjust the thickness of the layer of soil 22 to the spacing 20. It is believed to be within the capacity of one of ordinary skill in the art to choose a feeding device 21 and a thickness regulator device 22 appropriate for that purpose.

As the upper run 12' of the belt 12 and the lower run 16' of the belt 16 move in directions 13 and 17, respectively, the layer of soil 22 enters and moves through the space 20 delimited by the top surface of the upper run 12' of belt 12 and the underside of the lower run 16' of belt 16. Of course, the upper run 12' of belt 12 and the lower run 16' of belt 16 move in directions 13 and 17, respectively, at the same linear speed.

The conveyor system 11 of FIG. 3 further comprises a first pair of electrodes 23 and 24, a second pair of electrodes 25 and 26, and a third pair of electrodes 27 and 28. As illustrated, the electrodes 23–28 are planar electrodes made of a plate of electrically conductive material.

In the first pair, the anode 23 is applied to the top face of the lower run 16' of the upper conveyor belt 16, and the cathode 24 is applied to the underside of the upper run 12' of the conveyor belt 12. In the second pair, the anode 25 is applied to the top face of the lower run 16' of the upper belt 16, and the cathode 26 is applied to the underside of the upper run 12' of the lower conveyor belt 12. Finally, the anode 27 of the third pair is applied to the top face of the lower run 16' of the upper conveyor belt 16, and the cathode 28 is applied to the underside of the upper run 12' of the conveyor belt 12. As can be appreciated, the electrodes 23–28 do not interfere with the movement of the lower conveyor belt 12, the upper conveyor belt 16 and the thin layer of soil 22 lying in between these upper and lower belts.

In the first pair, the anode 23 has therefore a bottom surface facing a top surface of the cathode 24. In the second pair, the anode 25 has a bottom surface facing a top surface of the cathode 26. Finally, in the third pair, the anode 27 has a bottom surface facing a top surface of the cathode 28.

Depending on the soil to be treated (decontaminated) or on other conditions particular to a given application, water or preconditioning solutions are added to the porous membrane forming the lower run 16' of the belt 16, and therefore to the soil 22 by means of sprinklers or other distribution devices such as 29 in FIG. 3 before passing between each pair of electrodes 23,24; 25,26; and 27,28. Also, the different pairs of electrodes 23,24; 25,26 and 27,28 may be operated under the same or different levels of voltage and/or current intensities.

The decontaminated soil 22 is recovered at the downstream end of the upper runs 12' and the lower run 16' of the conveyor system 11, opposite to the feeding device 21. An appropriate scraper device 30 can be used for that purpose.

Upon movement from the roller 15 to the roller 14, the lower conveyor belt 12 including the porous medium is cleaned and reconditioned at the lower run 12" by means of different processes which may include scrubbing though the scraper device 30, flushing at 31, immersion in different solutions 32 and 33, wringing 34, and other. The lower run 12' of the lower conveyor belt 12 between the rollers 14 and 15 is guided by means of a plurality of rollers 35–40 to successively pass into a series of three reservoirs including reservoir 41 containing solution 32, reservoir 42 including solution 32 and reservoir 43 including solution 33. The purpose of the last immersion of the porous medium into solution 33 before re-entering the system 11 is to recondition the porous medium to the desired pH. In most instances, the reconditioning of the porous medium aims at providing a certain damping capacity against the cations OH⁻ produced at the cathode by the electrolysis.

The operation of the conveyor system 11 schematically illustrated in FIG. 3 should take into consideration the nature of the soil to be treated, the nature of the contaminants, the initial concentration of contaminants into the soil, and the degree of decontamination to be achieved. The parameters which may be adjusted or optimized are the amplitude of the electric potential and the intensity of the current, the velocity of the conveyor belt 12, the number of pairs of electrodes, the contact area of the electrodes, the thickness of the layer of soil, the thickness of the porous medium and the different processes of cleaning and reconditioning of the porous medium.

In certain situations, contaminants may move towards the anode due to their existence as anions or due to a reversed electro-osmotic flow following acidification of the soil. In those situations, the porous membrane 16 would preferably be cleaned and reconditioned using processes and installation of the same type as those used for the cleaning and reconditioning of the porous medium.

The system in accordance with the present invention drastically reduces the time and the electric energy required to decontaminate soil because the distance between the anode(s) and the cathode(s) is reduced to a minimum and because the contaminants do not have to be extracted at the electrodes, but have simply to be moved from the anodic zone (layer of soil) to the cathodic zone (porous medium). Since a certain increase in pH is allowed in the cathodic zone, there is no need for circulating solutions at the cathode to control the pH.

Example

Operation parameters such as the thickness of the soil being treated, the amplitude of the electric potential (voltage) or the intensity of the electric current, and the time of contact between the electrodes (speed of the conveyor) should be adjusted in relation to the nature of the soil being treated, the control acid 33 (FIG. 3) used to recondition the porous medium and the desired extraction or decontamination rate.

The present example relates to the adjustment of the above parameters from a series of tests conducted onto a silty soil contaminated in laboratory, in which the applied electric potential(s), the nature of the control acid 33 and the thickness of the soil being treated have been varied. After the contamination in laboratory, the silty soil contained about 4,000 ppm of lead (Pb) and 1,100 ppm of copper (Cu).

To obtain an extraction or decontamination rate of 90% when the cathodic zone (porous medium 12) is reconditioned with acetic acid 0.87 M (table vinegar) 33 (FIG. 3), the time of contact between the electrodes is one hour for a thickness of soil of 1.5 cm and a density of current of 10 $mA/cm^2$.

For a conveyor system comprising a series of three (3) successive electrode zones (pairs of anode/cathode) as illustrated in FIG. 3, the time of contact would then be twenty (20) minutes in each zone. If the porous medium is controlled by a weak acid, the conductivity of the treated soil reduces as decontamination progresses. To maintain a current density of 10 $mA/cm^2$ in each electrode zone for the silty soil of the subject example, the first zone should be operated at an electric potential of 10 V between the anode and the cathode, the second zone at an electric potential of 25 V between the anode and the cathode, and the third, last zone at an electric potential of 40 V. The energy consumed for extracting 90% of heavy metals initially present in the silty soil is then of the order of 200 $kWh/m^3$ and the volume of soil treated is about 2 $m^3$ for a period of 24 hours when the electrode zones have an area of 2 $m^2$. Alternatively, the same system could be operated at a density of current of 5 $mA/cm^2$. The energy consumed for extracting 90% of heavy metals initially present in the silty soil would then be reduced to about 100 $kWh/m^3$. The time of contact between the electrodes would however be increased and the volume of soil treated would be about 1 $m^3$ for a period of 24 hours when the electrode zones have an area of 2 $m^2$. The system thus allows a great flexibility and can be adjusted to improve performance and economy. For example, two conveyor systems could be used, the soil coming out of the first conveyor system being fed in the second conveyor system. This would obviously improve the production and would also allow to recondition the porous medium during the decontamination process with the same or different solutions.

For comparison purposes, treatment of the same silty soil in a large cell in which the thickness of the soil between the electrodes (anode and cathode) would be 75 cm, the time of contact or treatment would be about 22 days and the energy consumed 750 $kWh/m^3$ when the cathodic reservoir is controlled by means of acetic acid and when the voltage is limited to 110 V. During that period of 22 days, the conveyor system of this invention when comprising three (3) successive electrode zones of 2 m² would treat 44 m³ of soil when operated at a density of current of 10 mA/cm². To treat the same volume of soil during that period of 22 days, several large cells would have to be used to contain this volume of 44 m³ with a soil thickness of 75 cm between the electrodes and the energy consumed for the decontamination would be almost four times the energy consumed in the system of this invention.

The decontamination of a soil through an electrokinetic process first progresses rapidly and is much slower at the end of the treatment. The time of contact and the consumed energy would therefore be, in the preceding example, well lower to reach a decontamination of 75 or 80% instead of 90%.

The function of the porous medium is to retain the control solutions by capillarity and therefore to play a role of reservoir upon contact with the electrodes. Many commercially available materials can be used as porous mediums. Porous plastic materials fabricated from different polymers such as polyethylene, polypropylene, etc., present a porous network sufficiently thin and a pore volume of the order of 40%. Such materials, delivered under the form of rolls, are commercially available at relatively low cost in a wide range of thicknesses (2 mm to 20 mm) and accordingly, are well suited for an application to the present invention. Synthetic textile materials currently used as filtering materials can also be used as porous medium.

The thickness of the porous medium in contact with the cathode(s) must be adjusted in relation to the percentage of the porous volume of the material being used, of the pH of the acid used for reconditioning that porous medium, of the time of contact, and of the density of the current between the electrodes.

The porous membrane 16 may be made of the same, but thinner material as the porous medium. The liquid added to the porous membrane through the devices 29 will normally be water. However, in particular situations, an acidic or other solutions can be contemplated to improve the solubilization of contaminants and to establish a proper electric contact between the anode and the soil to be decontaminated.

The solution 32 in the reservoirs 41 and 42 can be the same solution or different solutions. It can also be the same solution as solution 33, for example acetic acid. Generally speaking, the solution 32 will be an acid suitable to clean and recondition the porous medium. It is believed to be within the capacity of one of ordinary skill in the art to select an appropriate acid taking into consideration the nature of the soil and of the contaminants.

The thickness of the layer of soil should be selected in view of reducing both the cost and the time of the treatment. Normally, an optimized process will conduct to a layer of soil having a thickness not exceeding 4–5 cm.

Although the present invention has been described herein above with reference to a preferred embodiment thereof, this embodiment can be modified at will, within the scope of the appended claims, without departing from the spirit and nature of the subject invention.

What is claimed is:

1. A system for decontaminating soil, comprising:
   a layer of porous medium having first and second opposite faces;
   first and second electrodes respectively situated on opposite sides of the layer of porous medium, said first and second electrodes having respective, mutually facing first and second surfaces, said first surface of the first electrode lying proximate the first face of the layer of porous medium, and said second surface of the second electrode being spaced apart from said second face of the layer of porous medium to define between said second face of the layer of porous medium and said second surface of the second electrode a spacing for receiving a layer of soil to be decontaminated and having a thickness lower than 6 cm;
   an electric source for applying an electric potential to the first and second electrodes in view of transferring the contaminants from the layer of soil to the porous medium.

2. The system of claim 1, wherein said first surface of the first electrode is applied to said first face of the layer of porous medium.

3. The system of claim 1, further comprising a porous membrane between the layer of soil and said second surface of the second electrode.

4. The system of claim 1, wherein the porous medium has a thickness varying between 2 mm and 20 mm.

5. A system for decontaminating soil, comprising:
   a first, lower conveyor belt comprising a porous medium and having an upper run defining upper and lower opposite faces;
   first and second electrodes respectively situated on opposite sides of said upper run of the first conveyor belt, said first and second electrodes having respective, mutually facing first and second surfaces, said first surface of the first electrode being applied to said lower face of the upper run of the first conveyor belt, and said second surface of the second electrode being spaced apart from said upper face of the upper run of the first conveyor belt;
   a second, upper conveyor belt forming a porous membrane and having a lower run defining an upper face applied to said second surface of the second electrode and a lower face delimiting with said upper face of the first conveyor belt a spacing;
   a feeding device for supplying a layer of soil to a first end of the upper run of the first conveyor belt;
   means for driving the first and second conveyor belts to move said upper and lower runs in the same direction and thereby move the layer of soil through the spacing between said lower face of the lower run and said upper face of the upper run; and
   an electric source for applying an electric potential to the first and second electrodes in view of transferring contaminants from the layer of soil to the porous medium as said layer of soil displaces between the first and second electrodes.

6. The system of claim 5, comprising a series of at least two pairs of electrodes, wherein (a) the electrodes of each pair have respective, mutually facing surfaces, (b) one of the mutually facing surfaces of the electrodes of each pair is applied to said lower face of the upper run of the first conveyor belt, and (c) the other of said mutually facing surfaces of the electrodes of each pair is applied to the upper face of the lower run of the second conveyor belt, wherein driving of the first and second conveyor belts displaces the layer of soil successively between the electrodes of the pairs of said series.

7. The system of claim 6, further comprising an electric supply for applying electric potentials of different amplitudes to the respective pairs of electrodes of said series.

8. The system of claim 5, further comprising a device for recovering the decontaminated soil at a second end of the upper run of the first conveyor belt, and a device for cleaning and reconditioning the porous medium in a second, lower run of the first conveyor belt.

9. The system of claim 8, wherein said cleaning and reconditioning device comprises at least one of the following means: (a) means for scrubbing the first conveyor belt, (b) means for flushing the first conveyor belt, (c) means for immersing the first conveyor belt in at least one solution, and (d) means for wringing the first conveyor belt.

10. The system of claim 5, further comprising means for adding a liquid to the porous membrane, said liquid being selected from the group consisting of water and a conditioning solution.

11. The system of claim 5, wherein the layer of soil has a thickness lower than 6 cm, and the porous medium has a thickness varying between 2 mm and 20 mm.

12. A method for decontaminating soil, comprising the steps of:

applying an electric potential to a pair of first and second electrodes, wherein said first and second electrodes have respective, mutually facing first and second surfaces;

placing between said first and second surfaces of the first and second electrodes a layer of soil having a thickness lower than 6 cm and superposed to a layer of porous medium, to expose said layer of soil to the electric potential in view of transferring contaminants from the layer of soil to the layer of porous medium, wherein said placing step comprises positioning the layer of porous medium proximate to the first surface of the first electrode and filling the space between said layer of porous medium and the second surface of the second electrode with said layer of soil.

13. A method as recited in claim 12, comprising the step of positioning the layer of porous medium proximate to the first surface of the first electrode comprises applying the layer of porous medium to the first surface of the first electrode.

14. A method as recited in claim 12, further comprising the step of interposing a porous membrane between the layer of soil and said second surface of the second electrode.

15. A method as recited in claim 12, wherein the porous medium has a thickness varying between 2 mm and 20 mm.

16. A system for decontaminating soil, comprising:

a layer of porous medium having first and second opposite faces;

first and second electrodes respectively situated on opposite sides of the layer of porous medium, said first and second electrodes having respective, mutually facing first and second surfaces, said first surface of the first electrode lying proximate the first face of the layer of porous medium, and said second surface of the second electrode being spaced apart from said second face of the layer of porous medium to define between said second face of the layer of porous medium and said second surface of the second electrode a spacing for receiving a layer of soil to be decontaminated;

a porous membrane interposed between the layer of soil and said second surface of the second electrode;

an electric source for applying an electric potential to the first and second electrodes in view of transferring the contaminants from the layer of soil to the porous medium; and a mechanism for displacing the layer of porous medium, the porous membrane, and the layer of soil between said first surface of the first electrode and said second surface of the second electrode.

17. A system for decontaminating soil, comprising:

a layer of porous medium having first and second opposite faces;

first and second electrodes respectively situated on opposite sides of the layer of porous medium, said first and second electrodes having respective, mutually facing first and second surfaces, said first surface of the first electrode lying proximate the first face of the layer of porous medium, and said second surface of the second electrode being spaced apart from said second face of the layer of porous medium to define between said second face of the layer of porous medium and said second surface of the second electrode a spacing for receiving a layer of soil to be decontaminated;

a porous membrane interposed between the layer of soil and said second surface of the second electrode;

an electric source for applying an electric potential to the first and second electrodes in view of transferring the contaminants from the layer of soil to the porous medium; and means for adding a liquid to the porous membrane, said liquid being selected from the group consisting of water and a conditioning solution.

18. A method for decontaminating soil, comprising the steps of:

applying an electric potential to a pair of first and second electrodes, wherein said first and second electrodes have respective, mutually facing first and second surfaces;

applying a porous membrane to said first surface of the first electrode;

placing between the porous membrane and said second surface of the second electrode a layer of soil superposed to a layer of porous medium, to expose said layer of soil to the electric potential in view of transferring contaminants from the layer of soil to the layer of porous medium, wherein said placing step comprises positioning the layer of porous medium proximate to the second surface of the second electrode and filling the space between said layer of porous medium and the porous membrane with said layer of soil; and displacing the layer of porous medium, the porous membrane, and the layer of soil between said first surface of the first electrode and said second surface of the second electrode.

19. A method for decontaminating soil, comprising the steps of:

applying an electric potential to a pair of first and second electrodes, wherein said first and second electrodes have respective, mutually facing first and second surfaces;

applying a porous membrane to said first surface of the first electrode;

placing between the porous membrane and said second surface of the second electrode a layer of soil superposed to a layer of porous medium, to expose said layer of soil to the electric potential in view of transferring contaminants from the layer of soil to the layer of porous medium, wherein said placing step comprises positioning the layer of porous medium proximate to the second surface of the second electrode and filling the space between said layer of porous medium and the porous membrane with said layer of soil;

adding a liquid to the porous membrane, said liquid being selected from the group consisting of water and a conditioning solution.

* * * * *